2,860,994
PREPARATION OF CANDIED FROZEN FOOD

Walter H. Oathout, Little Rock, Ark.

No Drawing. Application October 21, 1955
Serial No. 542,093

2 Claims. (Cl. 99—193)

This is a continuation-in-part of my earlier application Serial No. 447,930, filed August 4, 1954, now abandoned.

The invention relates to the preparation of frozen food and it has particular reference to frozen food which is candied before consumption, and is covered with a sweetening agent which is in a liquid or semi-liquid state.

The preparation of candied frozen food which contains a liquid or semi-liquid, but highly viscous sweetening agent covering the food product is a process in which difficulties are experienced in connection with the containers used, especially where the containers, as usual, consist of two parts which are joined. Containers of this type are frequently used in connection with frozen food which is heated in the oven at the required temperature in the container itself without removing the food from the container although the lid of the container will sometimes have to be removed. This type of packing frozen food has a special consumer appeal.

The container in such cases consists of a dishpan- or bowl-shaped box which holds the frozen food product which is closed by a cover or lid pressed into a groove of the box or retained by a protruding lip, a bent over edge of the box, or the like. While the containers of the type above mentioned are usually made of metal foil or lined with a metal foil and are therefore fluid tight themselves, a seal between the cover or lid and the dishpan- or bowl-shaped box can only be made fluid tight at great expense, the cost of this tightening process, with foods sold at low price, being usually prohibitive. Ordinary frozen food products, as long as kept at low temperatures, do not need a fluid tight seal, but candied food prepared with a semi-liquid viscose sweetener covering the food causes difficulties insofar as the sweetener, usually formed by a syrup, does not completely freeze at the temperature at which the foods are handled and stored and if it remains semi-liquid would require a fluid tight seal to exclude leakage during handling and also in the frozen state. Various attempts have therefore been made to prepare such candied frozen food, to be afterwards heated in an oven, with sweeteners which are either dry or which freeze, these attempts being however not accompanied by success.

No syrup, molasses or similar liquid was found which would actually freeze and remain frozen at the temperature at which food is handled and stored. Dry sweeteners which also have been tested were scorched by the heat in the oven and their flavor suffered materially to such an extent that the food was not marketable.

The invention therefore has for its object to provide a frozen candied food product with a sweetener, covering the candied product which is solid and practically dry at handling temperatures and at freezing and storing temperatures, but which is liquid without any change in flavor at higher temperatures such as prevailing in the frozen food product when heated for consumption. The invention consists in the composition of a sweetener for candied goods which is in a solid state and practically dry but which produces, upon heating, a viscous liquid sweetener without scorching and charring and without impairing the flavor.

In order to describe the invention in detail the preparation of candied yams (sweet potatoes) may be taken as an example. Food of this type is served hot and in order to have added consumer appeal such food is usually so prepared that it may be placed into an oven of suitable temperature without defrosting it. The tendency in connection with frozen food to be served, without defrosting, after heating it to the desired temperature goes towards freezing the food in a container which may directly serve as a baking pan or as a kind of skillet during the heating operation. Containers of this type for holding and storing the frozen food in the frozen state and during the heating operation are available. They regularly consist of dish shaped or bowl shaped box like portion of some depth in which the food is placed and which is covered by a flat or curved lid or cover, the circumferential portion of which is squeezed or pressed into a prepared groove or which is forced over or behind a protruding rib or behind the rolled or bent marginal portions of the dish shaped container.

The lid is usually placed on the other container portion before freezing and is usually removed before the container with the frozen food is placed into the oven for heating.

The container is usually made of metal or is lined with a metal foil so that it can hold the food also after thawing when in a horizontal position.

The candied food after thawing must be covered by a layer of the sweetener which usually consists of a syrup containing invert sugar which is essential for the taste. If the type of syrup would be used as a sweetener which is in general use for this purpose the container would have to be sealed tightly against liquids, because the syrup starts to defrost already at a low temperature. The lid in this case could not merely be pressed into its place but a much more elaborate seal would have to be provided. After the freezing of the product, especially if a slightly raised temperature would occur the syrup would revert into liquid condition and the handling of the containers at a temperature only slightly above the freezing temperature would immediately cause leakage of the liquid.

According to the invention the invert sugar containing syrup is produced during the heating process from a mixture which is dry at ordinary temperatures and which consists of a mixture of sugars and fruit juices to which gums may be added, the sugars being so selected that they produce invert sugar upon heating.

The mixture according to the invention has been so selected that it remains in a solid and relatively dry condition at all temperatures below that of the heating appliance, even if the mix is placed in a moist environment, a condition which may occur during packing and handling at all temperatures which are below the oven temperatures.

To obtain inverted sugar a particular mixture must be used, this mixture containing disaccharides, for instance, granulated white sugar, and in addition to the white sucrose dark brown sucrose. Further, the mixture must contain crystalline dextrose, for instance of the type sold under the trade-name "Cerelose" and it must further contain fruit acids, for instance orange juice concentrates or other fruit concentrates or crystallized citric acid.

This mixture can vary only to a certain degree. A mixture of 50 parts by weight of very fine granulated white sugar, 12½ parts by weight of dark brown sugar, 12½ parts by weight of dextrose and 2 parts by weight of fruit juice concentrate has been found to be a most effective average mixture.

It has to be emphasized that, although the proportions may vary to a certain degree, the mixture in itself is essential to develop a desirable flavor or sweetener and a desirable appearance in a product which has the ideal melting range, which product resists caramelization and charring when exposed to a temperature of 400°–425° F. This mixture remains in a solid substantially dry condition at temperatures such as occur during packing and handling and during all other processes to which the food is subjected up to the time when the product is placed in the oven for heating.

The sucrose of the cane sugar and the brown sugar are the disaccharides which form invert sugar. However, it has been found by experience that a product such as yams (sweet potatoes) when heated to 400°–425° F. does not yield a sufficient quantity of invert sugar when provided solely with a mixture of the disaccharides. The disaccharides are inverted in this case by the action of hydrogen ions which are furnished by the fruit acid when heated. Further, the fruit juice produces a pH of the mixture which is favorable to the inversion of sucrose.

If merely the white sugar and brown sugar were used insufficient syrup is formed also on account of charring which develops very rapidly at the oven temperatures. This is prevented by the addition of crystalline dextrose, a fact which is rather surprising, as the use of crystalline dextrose by itself leads to excessive charring and therefore leads to off-flavors which spoil the product.

However, in conjunction with the disaccharides (white sugar and brown sugar) its action is different. In the presence of moisture and when moderately heated, the dextrose liquefies and this non-aqueous liquid acts as a solvent for the disaccharides. This produces the result that the mix liquefies at a temperature which is below the melting point of sucrose without appreciable caramelization.

The resulting syrup is of high viscosity which is of great advantage, as the syrup is thus retained on top of the product and does not flow down rapidly where it would collect without performing fully its function, if less viscous. Only when the temperature is near its upper limit the syrup becomes less viscous, so that the syrup is very well distributed over the products.

The invert sugar together with the dextrose (Cerelose) form a group of monosaccharides which penetrate the cell structure much more readily than disaccharides. Further, the dextrose has also the additional function to impart a glazed and candied appearance to the product after baking and to control the excessive sweetness of the invert sugar.

It is thus seen that it is a mixture of sugars with the fruit juice which produces the desired result of having a dry product at handling, freezing and storage temperatures while having the desired liquid sweetener for the candied final product formed during the heating process.

The proportion of brown sugar added to the mixture may be changed in order to obtain a final product of desired color. For instance, if the products to be candied are unusually light in color the proportion of brown sugar may be increased in order to obtain a darker color of the product.

A slight change of proportions is also sometimes necessary on account of differences in air temperature and humidity at the time of packing.

Corn syrup may be substituted for dextrose; with such a substitution it is of advantage to use citric acid crystals instead of fruit juice concentrates and especially orange juice concentrates or similar concentrates.

Further, under certain circumstances it may be of advantage to add waxy rice flour, waxy cornstarch, tapioca or tragacanth or other edible gums. This addition as a rule should not exceed 1–5% weight of the mixture.

*Example*

The preparation of frozen candied sweet potatoes may be taken as an example.

For a package of frozen sweet potatoes weighing 14 oz., 10 oz. of peeled potato slices are used which are sprayed with salad oil and are cooked in some type of a cooker which also dehydrates, for instance in an infrared process cooker. Such a cooker produces a partial dehydration of the slices.

When processing sweet potatoes in quantity, this process is conducted by first washing, then preheating the potatoes to reduce the proportion of starch to sugar. Then the potatoes are placed in a caustic solution in order to loosen their peel. The peel is then removed in spirals with abrasive surfaces after which process the potatoes are placed on a conveyor and are trimmed. The trimmed potatoes are then passed through a slicing machine where they are transversely sliced to a thickness of about ½ in. and are blanched for several minutes at a temperature near boiling temperature and finally they are submerged in a solution of ascorbic acid to prevent discoloration.

Transverse slicing of the yams is necessary to cut the longitudinal fibers of such potatoes which are objectionable in such a product.

The slices are then placed on oiled pans and they receive a top coating of salad oil whereupon they are introduced into an infra-red oven where they are thoroughly cooked. The heat radiated by the infra-red oven in addition to cooking the slices also has a dehydrating effect on the potato slices. This dehydration has a desirable effect since a partial dehydration precludes an excessive dilution of the syrup in the finished product.

After cooking the slices are transferred to a packing line where 10 oz. of potato slices are packed into each box. 4 oz. of sugar mix are then put on top of the slices in the box. The box is then closed by means of the lid, is wrapped in a waxed paper provided with the label and is quick frozen in the well known manner.

The sugar mix is prepared preferably in batches of 77 lb. and each batch consists of:

| | Parts by weight |
|---|---|
| Extra fine granulated white sugar (white sucrose) | 50 |
| Brown sugar (brown sucrose) | 12½ |
| Dextrose, crystalline (Cerelose) | 12½ |
| Orange juice concentrate (frozen) | 2 |

In addition to these ingredients one of the following ingredients may be added: Waxy rice flour, waxy cornstarch, tapioca, gum tragacanth and other synthetic or vegetable gums. The gum is added to the above batch to the extent of 12 oz. to the batch. This addition under certain conditions may add to the consistency of the syrup formed and to the good appearance of the product.

It will be clear that the proportions above given and other less essential details may be changed without in any manner departing from the essence of the invention as defined in the annexed claims.

What is claimed as new is as follows:

1. The process of producing frozen candied foods to be held in a non-fluid tight container in frozen state which consists in adding to food a mixture of around 62½ parts by weight of disaccharides selected from the group consisting of granulated white sugar and brown sugar in dry and solid condition at temperatures below a heating temperature of around 400° F., to which have been added 12½ parts by weight of monosaccharides selected from a group consisting of crystalline dextrose and corn sugar, being in dry condition at freezing temperatures and at temperatures below the above stated temperature, further adding to said mixture about 2 parts by weight of a fruit juice concentrate, in heating the frozen food to a temperature of 400° F.–425° F., thus liquefying the monosaccharides which form a solvent for the disaccharides, the latter, being partly inverted by the fruit juice concentrate, forming a viscous syrup covering the food and forming a coating for the same thus producing a candied food.

2. The process of producing frozen candied sweet potatoes to be held in a non-fluid tight container in frozen state, comprising the cooking under partial dehydration of sweet potatoes, adding to the prepared sweet potatoes to be frozen a solid and dry mixture of around 62½ parts by weight of disaccharides selected from a group consisting of granulated white sugar and brown sugar, in a dry and solid condition at temperatures below a heating temperature of around 400° F., to which have been added 12½ parts by weight of monosaccharides selected from a group consisting of crystalline dextrose and corn sugar, being in dry condition at freezing temperature and at temperatures below the above stated temperature, further adding to said mixture about 2 parts by weight of a fruit acid, said ingredients producing a relatively dry and solid mixture of sugar and fruit acid, and of heating the frozen product for consumption to a temperature of 400° to 425° F., said heating liquefying the solid mixture through an inversion of the component sugars and producing a viscous syrup covering the sweet potatoes and forming a coating for the same, the heating thus producing a candied sweet potato.

References Cited in the file of this patent

UNITED STATES PATENTS

| | | |
|---|---|---|
| 1,532,271 | Slay | Apr. 7, 1925 |
| 1,564,599 | Magaw et al. | Dec. 8, 1925 |
| 2,482,202 | Noyes | Sept. 20, 1949 |
| 2,516,891 | Lloyd | Aug. 1, 1950 |

OTHER REFERENCES

"Waxy Rice Flour Improves Frozen and Canned Precooked Foods," United States Department of Agriculture, Agricultural Research Service, R. A. S. 173, issued September 1954.